July 18, 1939.  C. E. PAGE  2,166,728

BEVERAGE DEVICE

Filed Sept. 14, 1936   4 Sheets-Sheet 1

Charles E. Page, INVENTOR.

BY Thomas A. Hill ATTORNEY.

July 18, 1939.  C. E. PAGE  2,166,728
BEVERAGE DEVICE
Filed Sept. 14, 1936  4 Sheets-Sheet 2

Charles E. Page, INVENTOR.
BY
Thompson & Hill
ATTORNEY.

July 18, 1939.   C. E. PAGE   2,166,728
BEVERAGE DEVICE
Filed Sept. 14, 1936   4 Sheets—Sheet 3

Charles E. Page, INVENTOR.
BY Thomas O. Hill.
ATTORNEY.

July 18, 1939.  C. E. PAGE  2,166,728
BEVERAGE DEVICE
Filed Sept. 14, 1936   4 Sheets-Sheet 4

Charles E. Page, INVENTOR.
BY
ATTORNEY.

Patented July 18, 1939

2,166,728

UNITED STATES PATENT OFFICE 2,166,728

BEVERAGE DEVICE

Charles E. Page, Brooklyn, N. Y.

Application September 14, 1936, Serial No. 100,669

12 Claims. (Cl. 219—43)

My invention relates to improvements in the brewing and merchandising a beverage such as coffee, and more particularly has reference to a device for brewing or heating and illuminating coffee in food dispensing establishments or in the home.

Figure 1:
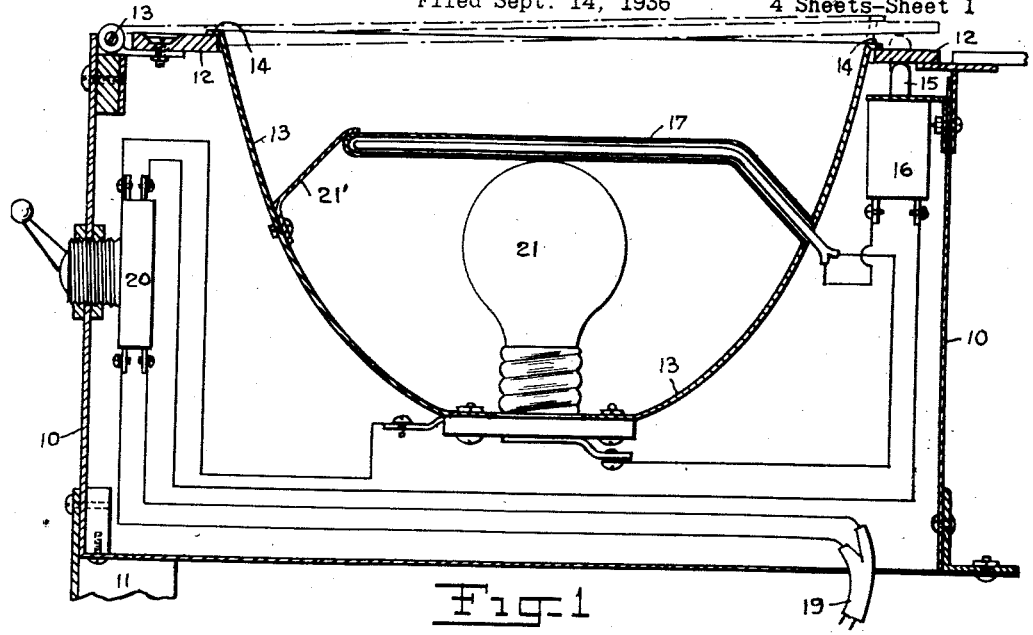
Figure 2:
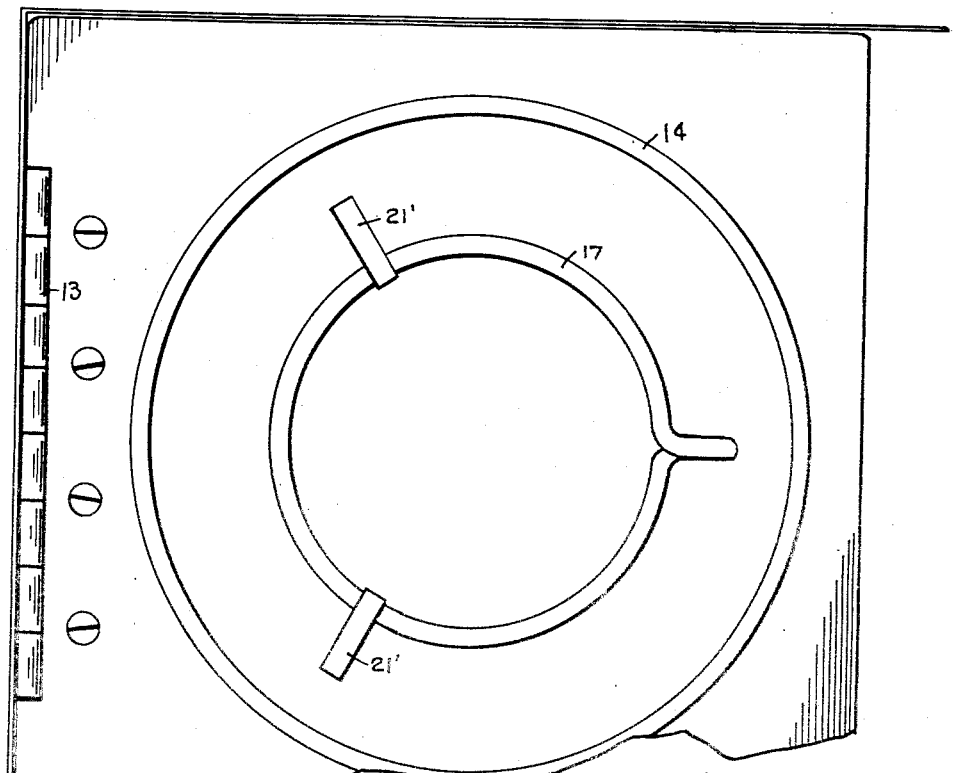
Figure 3:
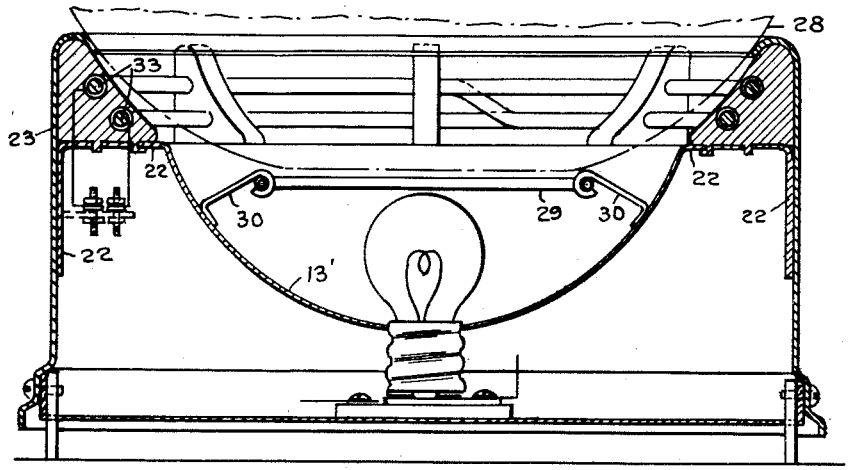
Figure 5:
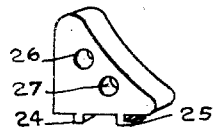
Figure 6:
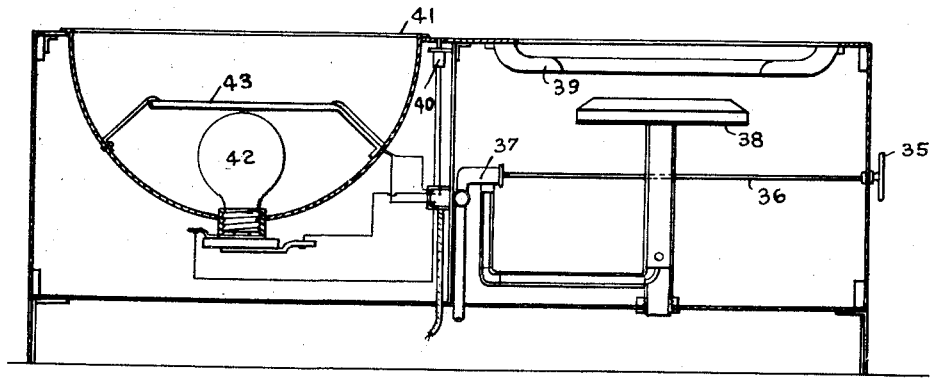
Figure 7:
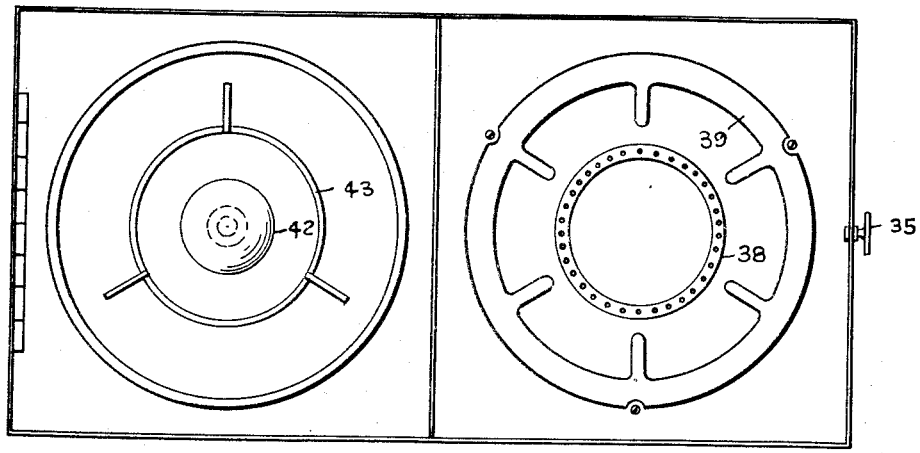
Figure 8:
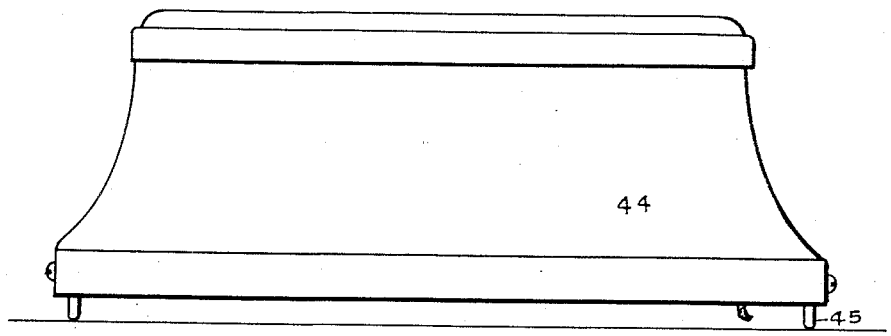
Figure 9:
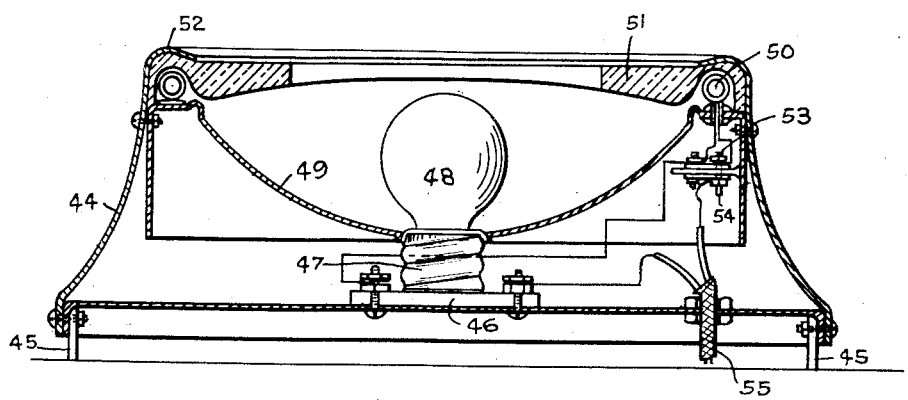

Referring to the accompanying drawings, Fig. 1 illustrates in vertical section, a suitable form of device embodying an application of my invention. Fig. 2 is a plan view thereof partly broken away. Fig. 3 is a vertical section of a modified form of device, and Fig. 4 a plan view of the same partly broken away. Fig. 5 is a detail in perspective of one of the supporting brackets shown in Fig. 3. Fig. 6 is a view in vertical section showing a combination of separate cooking and illuminating devices, and Fig. 7 is a plan view thereof. Fig. 8 is a front elevation of a suitable form of device for household use, and Fig. 9 shows the same in vertical section.

It is a common practise, in restaurants and other places where coffee is sold as a beverage, to prepare the coffee in glass or other transparent or translucent containers which are then placed within the view of the customers or prospective purchasers. The coffee in such containers is usually kept warm by a gas flame which emits little or no light, and which is subject to variations due to manual control, fluctuations in gas pressure and changing air conditions surrounding the flame. It will be observed that, in such conditions, the only appeal which the coffee beverage makes to a prospective customer is by reason of the customer's knowledge of the taste of the beverage, this being aided by the aroma of the brewed coffee.

According to the present invention, I propose to provide means which, while keeping the coffee at a uniform hot temperature, will illuminate the brew in such a manner that the Burgundy color thereof will be visible. The light shining through the beverage will cause this attractive color to be apparent to the customer, attracting his attention to the beverage and adding the visual appeal to the aroma and known taste of the beverage.

It is a principal object of my invention to provide a device which will be operative to simultaneously maintain a beverage at a predetermined temperature, and illuminate the same by sending rays of light therethrough.

A further object is to provide a device which will operate to illuminate a beverage and which illuminating means will become operative when the beverage container is placed in operative position adjacent the light source.

A further object is to provide a beverage illuminating device including means associated therewith for preparing the beverage.

A still further object is to provide a beverage illuminating and brewing or heating device having associated therewith means for supporting a beverage container, such illuminating, heating and supporting means being so positioned and arranged as to permit light from the source of illumination to pass un-obstructedly into the beverage in the container, the container being so supported that an unobstructed view of the beverage therein may be secured.

A still further object is to provide a device of the character described, which may be easily and cheaply manufactured and assembled, but which will be strong and rugged in construction.

Other objects and features of novelty will be apparent from the following specification and the attached drawings, it being clearly understood, however, that such specification and drawings are only descriptive of the invention, for the limits of which reference must be had to the appended claims.

Referring now to the drawings, and particularly to Figs. 1 and 2 thereof, there is disclosed therein one form which the invention may take. In this form there is provided a casing or stand having the vertical, opaque sides 10, the legs 11 and a suitable enclosing bottom. The upper end of the casing is provided with a plate 12 which may be hinged to one of the sides 10, and which is provided with a central, preferably circular aperature, within which is arranged an upwardly facing reflector device 13. The bottom of the reflector is disposed substantially adjacent the bottom of the casing and has arranged, adjacent its lowest point, a socket or other supporting means for an electric light bulb 21. It will be apparent that the light from bulb 21 will be concentrated by the reflector 13 and directed upwardly through the central aperture in the hinged plate.

Means are provided by the invention for supporting a beverage container in such a position that light from the source 21 will be concentrated and directed through the beverage within the container. Such means comprise a preferably annular ring or support 17, which is connected to the interior surface of the reflector 13 by any suitable means such as the supports 21' and the plane of which is arranged just above the upper portion of the light source 21. This support may be formed of hollow tubing in order to have a heating element disposed therein, as will be described more fully hereinafter.

Means are provided for simultaneously energizing the illuminating means 21 and the heating means within the support 17, and such means comprise a switch device 20 having two pairs of connectable contacts, one pair of which are connected through two leads 19 to a source of power, not shown, while the other two contacts are connected in series to the lamp 21 and the heating element within the support 17. The switch device 20 may be arranged at any suitable location and is provided with an operating lever.

It will be apparent that a transparent or translucent container having a beverage such as coffee therein may be mounted on the support 17. Generally, such containers are spherical in shape, in which event they will be best supported by the annular ring type of support, as disclosed. Further, due to the disposition of the support 17 with respect to other parts of the device the container will cover substantially all of the open end of the reflector 13, and the greater part of the container will be disposed above the upper surface of the entire device. When the switch 20 is operated lamp 21 will be energized and the rays of light therefrom will be concentrated and directed, by the reflector 13, through the transparent or translucent container and through the beverage in the container, thereby illuminating the beverage and causing its characteristic color to be visible to those who may view it. At the same time the heating element in support 17 will be operated to warm the beverage, although it will be apparent that the heating element may be omitted, in which case the heat radiated by lamp 21 will be effective to heat the beverage.

Figure 4:
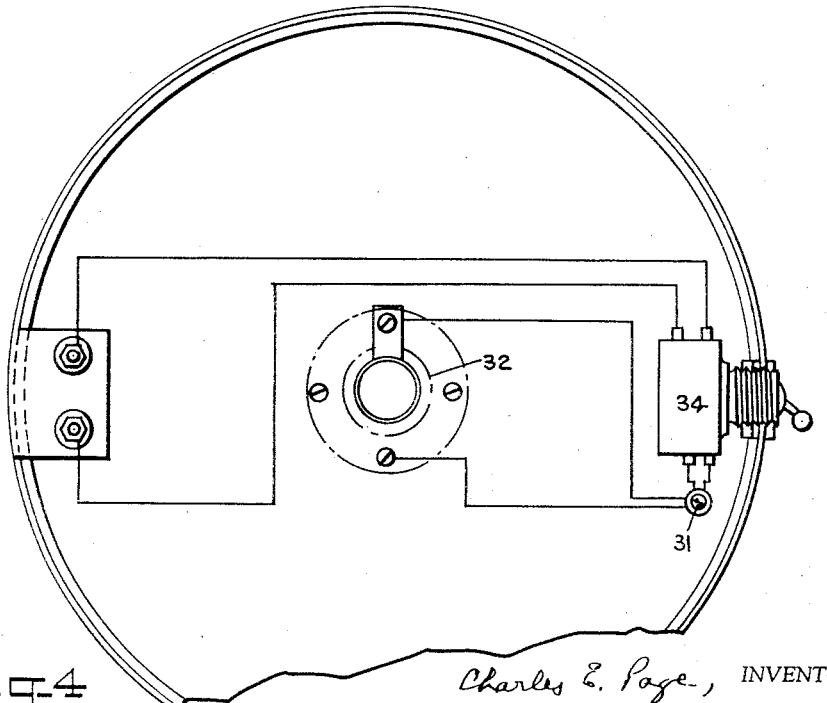

In Figs. 3, 4 and 5 of the drawings there is disclosed a modified form of the invention. In this form the source of illumination, comprising an electric bulb, is mounted on the base of the casing and extends upwardly within the reflector 13'. Obviously, the bulb may be placed within the reflector in the manner shown, or may extend at right angles thereto. The reflector 13' is provided, at its upper open end with a lateral, annular flange 22 which extends into engagement with, or may be formed integrally with, the walls of the main supporting device. This flange provides an annular surface between the upper edge of the reflector and the wall of the main supporting device, upon which surface are received bracket members 23 which are spaced circumferentially of the reflector and which are attached to the flange 22 by suitable means, such as by tongues 24, 25 formed on the brackets and received in openings in the flange. The brackets 23 are provided with aligned, transverse openings within which are received heating elements 33, which are electrically connected with the lamp 32 and an operating switch 34 by suitable leads. An annular member 29 may be positioned within the reflector and supported above the lamp 32 by supports 30, for a purpose to be explained.

It will be noted that in the form of invention described the heating elements are so positioned with respect to each other and with respect to the lamp that they will lie in substantial abutment with the surface of a spherical container which may be supported by the brackets 23. It has been found that heating elements positioned in the manner described are very efficient in their action. It will, of course, be apparent that by the use of the proper type of switch the lamp may be employed independently of the heating element, in which case the heat radiated by the lamp will be effective to maintain the coffee at a predetermined temperature. The annular member 29 is provided for the purpose of preventing the tipping over of a spherical container supported on the brackets 23.

In Figs. 6 and 7 there is disclosed a further modified form of the invention in which the beverage is brewed on one heater of a stove and is then placed on a second warming part of the stove, where it may be kept warm and, at the same time, be illuminated in the manner according to this invention. In this form of the invention there is provided a brewing stove which is disclosed in the drawings as a gas stove having the burner 38 and container support 39. A fuel inlet 37 is provided and is controlled by a valve which is actuated by a rod 36 having an operating handle 35 thereon. Adjacent the brewing stove and preferably arranged within the same casing or supporting member there is provided a warming and illuminating device comprising an upwardly-directed reflector having a source of light 42 arranged in the lower portion thereof. An annular supporting member 43 may be arranged just above the lamp 42 and may be supported there in any suitable manner. It will be seen that a container, such as a spherical, transparent container may be supported directly on the member 43 or may be supported by the upper, annular edge of the reflector, in which case the member 43 will serve to prevent undesired tipping over of the container. The upper, open end of the reflector is hingedly connected to the main supporting casing and preferably the reflector is mounted within a hinged cover plate which covers the upper open end of the casing. Beneath one of the free edges of the cover plate there is arranged a switch device 40 which is included in the circuit between the lamp 42 and a source of power. The switch device is so constructed that it normally supports the cover plate and reflector in slightly raised position, in which condition the switch device is not closed and the lamp 42 is therefore un-energized. When a container is placed upon the supporting device 43 or is supported by the upper annular edge of the reflector the added weight causes the reflector to be depressed, thereby closing the switch 40 and connecting the source of power to the lamp 42. The lamp 42 will provide heat for warming the beverage within the container and will also illuminate the beverage, the reflector acting to concentrate the light and direct it through the beverage in the container. If desired, a heating element may be associated with the supporting ring 43 and may be connected in series with the lamp 42 in order to be operated therewith.

In Figs. 8 and 9 there is disclosed a form of the invention in which is provided an enclosing shell 44 having a bottom and legs 45. A reflector 49 is positioned within the shell and, arranged within said reflector is a lamp 48, the same being suitably supported by means of a socket 47. Arranged adjacent the upper edge of the annular member 44 and also adjacent the upper edge of the reflector 49 is an annular supporting member 51, the same being provided with a central opening which is disposed above and concentrically with the lamp 48. The upper edges of the shell 44 and the reflector 49 may be suitably flanged to provide a support for the annular supporting member 51.

It will be apparent that a container may be supported above the lamp by positioning it upon the support 51, in which position the lamp 48 will provide heat for the beverage within the container and light for illuminating such beverage. It will be apparent that a separate heating member may be provided for heating the beverage and, in the drawings one possible form of heating element is disclosed, the same comprising the annular member 50 which is disposed adjacent the upper edge of the reflector.

Suitable leads 55 and connecting and switching devices 53, 54 are provided for connecting and disconnecting the lamp 48 to and from a suitable source of power. If a separate heating element, such as member 50, is provided, this may also be connected to the circuit arrangement in such a manner that the lamp may be energized simultaneously with the heating element or may be separately energized.

While I have illustrated and described a number of forms which my invention may take, it is to be clearly understoood that such forms are only to be considered as being illustrative of the invention. Obviously, other devices may be provided in which means are provided for illuminating a beverage, and many additional forms of the invention may occur to those skilled in the art, as well as improvements in and modifications of the forms disclosed. All of such different forms, improvements and modifications are to be considered as coming within the scope of my invention, for the limits of which reference must be had to the appended claims.

Of course it will be understood that various modifications may be made in the construction and arrangement of parts without departing from the spirit of the invention as claimed.

I claim:

1. A device for heating and illuminating a beverage, comprising a stand adapted to support a transparent or translucent container, means supported by said stand and adapted to be adjacent a container supported thereby and being primarily a source of light and secondarily a source of heat and which is adapted to cause light and heat radiations therefrom to pass into and through the beverage in a container supported by said stand to thereby illuminate the beverage, and means for concentrating and directing the light and heat from said means onto said container and into the liquid therein.

2. A device for heating and illuminating a beverage, comprising a stand adapted to support a transparent or translucent container, means arranged within said stand and being primarily a source of light and secondarily a source of heat and being adapted to cause light and heat radiations therefrom to pass into and through the beverage in a container supported by said stand to thereby illuminate the beverage therein, and a separate heating element arranged to be adjacent said container and adapted to heat the beverage therein.

3. A device for heating and illuminating a beverage, comprising a stand having a portion adapted to support a transparent or translucent container, means arranged below said supporting portion and being primarily a source of light and secondarily a source of heat and being adapted to cause light and heat radiations therefrom to pass into and through the beverage in a container supported by said stand to thereby illuminate the beverage, and means for concentrating the light and heat from said means and directing it onto a container carried by said supporting portion.

4. A device for heating and illuminating a beverage contained in a transparent or translucent container, comprising a stand adapted to support said container and having opaque side walls, the upper portion of said stand being open and being adapted to provide an annular support upon and within which a container may be placed, and which open portion will be substantially completely closed by said container, and means disposed within said stand and below the open portion thereof and being primarily a source of light and secondarily a source of heat and being operable to cause light and heat radiations therefrom to pass into and through the beverage in a container supported by said stand to thereby illuminate the beverage therein.

5. A device for heating and illuminating a beverage contained in a transparent or translucent container, comprising a casing and supporting member, a source of light arranged in the lower portion of said casing, a reflector arranged about said light source and adapted to concentrate and direct the light from said source in an upward direction, said reflector having an open upper portion comprising an annular rim adapted to support a container in direct contact therewith, and means for energizing said light source for illuminating the beverage within said container.

6. A device for heating and illuminating the beverage in a transparent or translucent container, comprising a casing and supporting device, a source of light arranged therein, a reflector arranged about said light source, the upper, open end of said reflector adapted to provide a support for a container having a beverage therein, said reflector being mounted for vertical movement with respect to said casing, and means operated by downward movement of said reflector for connecting said light source to a source of power.

7. A device for heating and illuminating a beverage contained in a transparent or translucent container, comprising a casing and supporting member, a source of light arranged within said casing, a reflector disposed about said light source and adapted to concentrate and direct the light from said source in an upward direction, said reflector having an open upper portion comprising an annular rim adapted to support a container in direct contact therewith, and means operable by the placing of a container on said supporting rim for energizing said light source.

8. A device for heating and illuminating the beverage within a transparent or translucent container, comprising a casing and supporting device having an open upper end, a source of light disposed within said casing, a reflector arranged about said light source and being adapted for vertical movement with respect to said casing device, an electric circuit including said light source, a source of power and a switch for connecting said light source to said source of power, said switch being normally operable to hold said reflector in raised position, and being operable to closed position by the weight of a container placed upon the open, upper end of said reflector.

9. A device for heating and illuminating a liquid contained in a transparent or translucent container, comprising an enclosing and supporting member, a support for said container comprising a member carried by said enclosing and supporting member and having an open center portion adapted to receive the lower portion of said container, a heating device associated with said support for said container and adapted to heat said container, and means arranged within said enclosing member and being primarily a source of light and secondarily a source of heat and being adapted to cause light and heat radiations therefrom to pass into and through the beverage in a container supported by said supporting device to thereby illuminate the beverage therein.

10. A device for illuminating and heating a beverage, comprising a stand adapted to support a transparent or translucent container having a beverage therein, means arranged within said stand and being primarily a source of light and secondarily a source of heat and being adapted to cause light and heat radiations therefrom to pass into and through the beverage in a container supported by said stand to thereby illuminate the beverage therein, a plurality of circumferentially-arranged supporting devices arranged above said light source and having aligned, inclined faces adapted to receive and support a container, and heating elements carried by said supporting devices and adapted to heat said container and the beverage therein.

11. A device for illuminating and heating a beverage, comprising a stand adapted to support a transparent or translucent container having a beverage therein, a series of circumferentially arranged supporting brackets disposed about the periphery of the upper portion of said stand and extending inwardly thereof to provide a support for a container, a heating element carried by said supporting brackets and adapted to heat said container, means arranged within said stand and being primarily a source of light and secondarily a source of heat and being adapted to cause light and heat radiations therefrom to pass into and through the beverage in a container supported by said stand to thereby illuminate the beverage therein.

12. A device for heating and illuminating the beverage in a transparent or translucent container, comprising a casing and supporting device, a source of light arranged therein, a reflector arranged about said light source and so positioned as to project the rays of light upwardly from the light source, the upper, open end of said reflector being adapted to provide a support for a container having a beverage therein, said reflector being mounted on a horizontal pivotal support for vertical movement with respect to said casing, and means operated by downward movement of the reflector about the pivoted support for energizing the light source.

CHARLES E. PAGE.